United States Patent [19]
Yoon et al.

[11] Patent Number: 6,002,928
[45] Date of Patent: Dec. 14, 1999

[54] SWITCHING APPARATUS AND METHOD FOR TRANSCEIVER OF CELLULAR BASE STATION IN CODE DIVISION MULTIPLE ACCESS MOBILE TELECOMMUNICATION SYSTEM

[75] Inventors: Hyung-Ryul Yoon, Seoul; Sung-Gyu Kim, Kyungki-do, both of Rep. of Korea

[73] Assignee: SamSung Electronics Co., Ltd., Kyungki-do, Rep. of Korea

[21] Appl. No.: 08/812,166

[22] Filed: Mar. 6, 1997

[30] Foreign Application Priority Data

Mar. 6, 1996 [KR] Rep. of Korea .......................... 96-5849

[51] Int. Cl.$^6$ ....................................................... H04Q 7/32
[52] U.S. Cl. ................................. 455/423; 455/8; 455/103
[58] Field of Search ..................................... 455/423, 422, 455/428, 550, 555, 560, 115, 192.1, 67.1, 73, 78, 88, 226.1, 8, 9, 103

[56] References Cited

U.S. PATENT DOCUMENTS

| | | |
|---|---|---|
| 5,448,766 | 9/1995 | Sanning et al. .............................. 455/9 |
| 5,666,646 | 9/1997 | McCollum et al. ......................... 455/8 |
| 5,805,666 | 2/1996 | Ishizuka et al. . |

*Primary Examiner*—William Cumming
*Attorney, Agent, or Firm*—Robert E. Bushnell, Esq.

[57] ABSTRACT

A transceiver switching apparatus and method for maintenance and repair of a troubled transceiver in a cellular base station in a CDMA mobile telecommunication system. The apparatus has a switching module having a plurality of switches in combination, capable of simultaneous control of the switches with a single control signal. The switching apparatus includes a plurality of transceivers each being capable of generating an alarm signal upon occurrence of an abnormal state therein, and an alarm release signal upon removal of the abnormal state, each of the transceivers outputting an intermediate transmitting frequency converted from an intermediate receiving frequency signal on basis of a tuning frequency, at least one spare transceiver adapted for performing the same function as the transceivers, a receiving switching circuit having pairs of inputs and outputs for delivering the intermediate receiving frequency selectively to the plurality of transceivers and/or the spare transceiver, and a transmitting switching circuit having pairs of inputs and outputs for receiving the intermediate transmitting frequency selectively from the plurality of transceivers and/or the spare transceiver.

14 Claims, 3 Drawing Sheets

SWITCHING APPARATUS AND METHOD FOR TRANSCEIVER OF CELLULAR BASE STATION IN CODE DIVISION MULTIPLE ACCESS MOBILE TELECOMMUNICATION SYSTEM

CLAIM OF PRIORITY

This application makes reference to, incorporates the same herein, and claims all benefits accruing under 35 U.S.C §119 from an application entitled Switching Apparatus And Method For Transceiver Of Cellular Base Station In Code Division Multiple Access Mobile Telecommunication System earlier filed in the Korean Industrial Property Office on Mar. 6, 1996, and there duly assigned Ser. No. 5849/1996 by that Office.

BACKGROUND OF THE INVENTION

1. Field of the Invention

The present invention relates to a Code Division Multiple Access (hereinafter, referred to as CDMA) mobile telecommunication system and, in particular, to a switching apparatus and method for switching over to a spare transceiver for maintenance and repair of a troubled transceiver when the transceiver, preferably, but not exclusively, for use in a CDMA cellular base station, gets into trouble.

2. Description of the Related Art

Generally, a CDMA mobile telecommunication system is provided with a low power radio transmitter and receiver (transceiver) and a control unit in a central area of each service area, i.e., a cell, in which a cellular base station serves as a relay to communicate by radio with a selected mobile telephone terminal equipment. A receiving frequency applied from each mobile terminal equipment is converted and amplified into a much lower radio frequency, which is often referred to as an "intermediate frequency". The cellular base station converts the receiving frequency to the intermediate frequency, which is subsequently converted to a transmit intermediate frequency on basis of a tuning frequency of each transceiver.

A cellular base station of CDMA mobile telecommunication system has a multiplicity of transceivers adapted to convert an intermediate frequency to and from the respective different radio frequencies corresponding to each mobile terminal equipment, in which system the number of those transceiver depends upon the number of radio channels. When the system needs to perform maintenance and repair of a transceiver due to any one of the transceivers operating in a CDMA cellular base station getting into trouble or malfunctioning, one of a plurality of switches, each switch corresponding to a respective transceiver, i.e., the switch coupled to the troubled transceiver, is turned off to switch over to a predetermined spare transceiver that continues the conversion of the intermediate frequency instead of the troubled transceiver.

Thus, a problem of space occurs because of such a large number of switches in use which require a lot of control cables connected with those switches, and which inevitably leads to complicated construction of the transceiver system and higher cost.

SUMMARY OF THE INVENTION

It is accordingly an object of the present invention to provide a switching apparatus and method for selecting a spare transceiver when performing maintenance and repair of a troubled transceiver in a cellular base station, preferably, but not exclusively, for use in a CDMA mobile telecommunication system, provided with a single switch module having a plurality of switches in combination.

It is another object to provide a switching apparatus and method capable of simultaneously controlling a plurality of switches with a single control signal for selecting a spare transceiver upon detection of a malfunctioning one of a plurality of transceivers in the cellular base station.

It is still another object to provide a switching apparatus and method for switching over transmission and reception frequencies of a troubled transceiver of a plurality of transceivers in a cellular base station to a spare transceiver.

These and other objects may be achieved according to the present invention can be accomplished with a transceiver switching apparatus for use in a cellular base station of a mobile telecommunication system, constructed with a plurality of transceivers each having an alarm detection and release sensing circuit, for generating an alarm signal upon occurrence of an abnormal state in the respective transceiver, and generating an alarm release signal upon removal of the abnormal state, each of the transceivers having a respective tuning frequency, the transceivers outputting a transmission intermediate frequency in response to received first and second intermediate receiving frequencies converted on basis of the respective tuning frequency; at least one spare transceiver for outputting an intermediate transmitting frequency signal converted from selected ones of the first and second intermediate receiving frequency signals upon receipt of and in response to operational data for switching the spare transceiver being adapted for performing the same function as one of the plurality of transceivers; a first receiving switching circuit having a plurality of pairs of inputs/outputs for inputting first intermediate receiving frequencies and outputting them to each transceiver corresponding thereto, for selecting the one of the first intermediate receiving frequencies for output to the spare transceiver through an alternate output in response to a detection control signal, and for switching over so as to connect the selected one of the first intermediate receiving frequencies back to the original paired output in response to a normal return control signal; a second receiving switching circuit having a plurality of pairs of inputs/outputs for inputting second intermediate receiving frequencies and outputting them to each transceiver corresponding thereto, for selecting one of the second intermediate receiving frequencies for output through an alternate output to the spare transceiver in response to the detection control signal, and for switching over so as to connect the selected one of the second intermediate receiving frequencies back to the original paired output in response to a normal return control signal; a transmitting switching circuit having a plurality of pairs of inputs/outputs corresponding to the transceivers, for receiving the intermediate transmitting frequencies from the transceivers for transmission output, an alternate input for receiving the intermediate transmitting frequency from the spare transceiver, for switching over so as to connect the alternate input to a selected output in response to the detection control signal, and for switching over so as to connect each of inputs of the input/output pairs to the corresponding output in response to the normal return control signal; a memory for storing the operational data necessary for the switching operation of the respective transceivers; and a controller for providing the operational data of an abnormally operating transceiver to the spare transceiver in response to the alarm signal, providing the detection control signal to the first and second receiving switching circuit and the transmitting switching circuit upon receipt of the alarm signal, and providing the normal return control signal to the first and second receiving switching circuit and the transmitting switching circuit upon receipt of the alarm release signal.

Another aspect of the present invention can be accomplished with a method for transceiver switching in a cellular base station, operable in a transceiver switching apparatus constructed with a plurality of transceivers capable of generating an alarm signal upon occurrence of an abnormal state, and an alarm release signal upon removal of the abnormal state, each of the transceivers outputting an intermediate transmitting frequency converted from an intermediate receiving frequency signal on basis of a tuning frequency, at least one spare transceiver adapted for performing the same function as the transceivers, first and second receiving switching circuits each having pairs of inputs/outputs for delivering, respectively, first and second intermediate receiving frequencies selectively to the plurality of transceivers and/or the spare transceiver, and a transmitting switching circuit having pairs of inputs/outputs for receiving the intermediate transmitting frequencies selectively from the plurality of transceivers and/or the spare transceiver, the method including the steps of: checking whether the spare transceiver is operating when an alarm signal is detected from one of the plurality of transceivers; determining whether the troubled transceiver has a high or low priority in operation if the spare transceiver is operating, and if a low priority is detected, then returning to the preceding checking step after a lapse of a predetermined time; providing a predetermined set of data for switching operation including a tuning frequency of an abnormally operating one of the transceivers to the spare transceiver if the spare transceiver is not operating, and thereafter, applying a switching control signal to the first and second receiving switching circuits and the transmitting switching circuit to replace the abnormally operating transceiver with the spare transceiver; and applying a normal return control signal to the first and second receiving switching circuits and the transmitting switching circuit for a recovery to the original transceiver replaced by the spare transceiver when an alarm release signal is received from the previously abnormally operating transceiver.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1A:
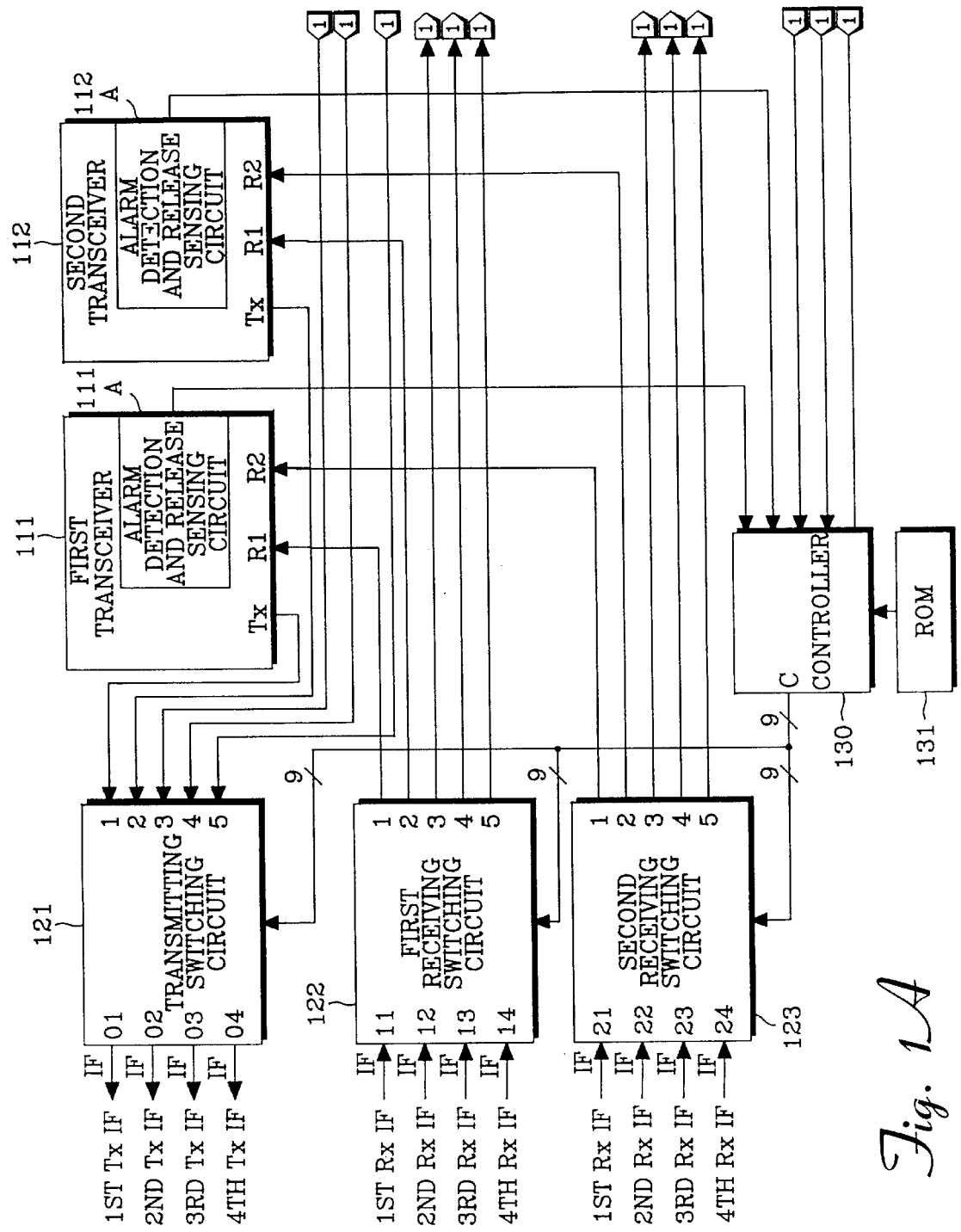
FIGS. 1A and 1B provide a block diagram illustrating the construction of a preferred embodiment of a transceiver switching apparatus for maintenance and repair of a troubled transceiver according to the principles of the present invention.
Figure 1B:
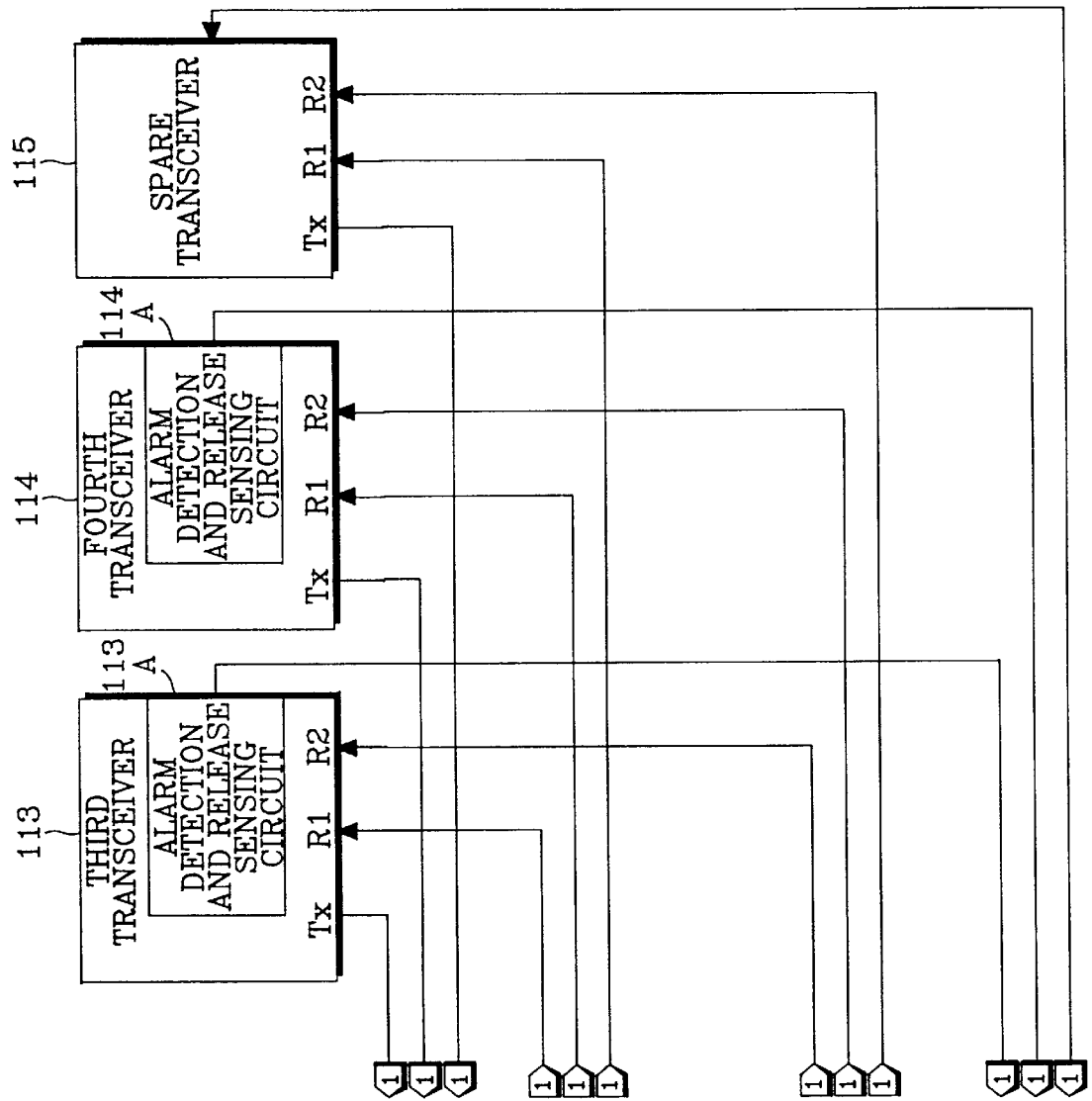

Referring now to FIG. 1, a transceiver switching apparatus for maintenance and repair of a troubled transceiver is shown, in which four different intermediate frequencies (IF) are respectively provided by means of four transceivers 111, 112, 113 and 114, and a spare transceiver 115, all of which performs the identical function and have a respective different tuning frequency by which an intermediate receiving frequency is converted to an intermediate transmitting frequency, wherein the intermediate transmitting frequency is adapted to be changed by a more or less frequency amount from the intermediate receiving frequency. Alarm detection and release sensing circuits 111A, 112A, 113A and 114A each detect an abnormal state of their respective transceivers to provide an alarm signal or an alarm release signal as an output respectively.

A memory 131 for storing tuning frequencies and operating data of transceivers 111–114, wherein memory 131 is preferably embodied with a ROM because the operating data and the tuning frequency of each transceiver need to be stored permanently. A controller 130 receiving the alarm signal provides the tuning frequency of the troubled transceiver and its operating data to the spare transceiver 115 and outputs a detection control signal. The controller receiving the alarm release signal provides a control signal for normal return.

First and second receiving switching circuits 122 and 123 each have four inputs for receiving the first to fourth intermediate receiving frequencies respectively and five outputs to the transceivers. The first and second receiving switching circuits 122 and 123 are adapted for the purpose of the so-called diversity effect and carry out the same function. The first and second receiving switching circuits 122 and 123 each serve to switch over to connect either one of outputs 1 to 4 for any troubled one of the transceivers 111 to 114 with an output 5 of the spare transceiver 115 responsive to the control signal of the controller 130. A transmitting switching circuit 121 has five inputs for receiving the intermediate transmitting frequencies from the transceivers 111 to 115, respectively, and four outputs. The transmitting switching circuit 121 serves to switch over to connect either one of the inputs 1 to 4 from any troubled one of the transceivers 111 to 114 with the input 5 from the spare transceiver 115 responsive to the control signal of the controller 130.

The controller 130 provides the detection control signal and the control signal for normal return to the transmitting switching circuits 121 and the first and second receiving switching circuits 122 and 123 through a 9-pin cable. The transmitting switching circuits 121 and the first and second receiving switching circuits 122 and 123 can be simultaneously controlled by a single control signal from the controller 130.

Referring to the above circuit construction, normally the first to fourth intermediate receiving frequencies are supplied to first and second receiving switching circuits 122 and 123 and then provided to the corresponding transceiver through their respective input and output pairs, for example, 11 to 1, 12 to 2, 13 to 3 and 14 to 4. Likewise, first to fourth intermediate transmitting frequencies are supplied to transmitting switching circuit 121 and then switched to output through their respective input and output pairs, for example, 1 to 01, 2 to 02, 3 to 03 and 4 to 04. In a normal operating state, the first to fourth intermediate receiving frequencies (Rx IF) through the first and second receiving switching circuits 122 and 123 supplied to each R1 and R2 input of the first to fourth transceivers 111 to 114 are then converted via each output Tx to the first to fourth intermediate transmitting frequencies (Tx IF). When any one of transceivers 111–114 begin to malfunction, the input and output pair of first and second receiving switching circuits 122 and 123 and transmitting switching circuit 121 coupled to the troubled transceiver is connected with spare transceiver 115 in response to the 9-bit detection control signal output by controller 130. Then, when the troubled transceiver is repaired, the control signal for normal return is provided by the controller 130, first and second receiving switching circuits 122 and 123 and transmitting switching circuit 121 are again connected to the original transceiver.

Connection of respective input and output pairs in between first and second receiving switching circuits 122, 123 and transmitting switching circuit 121 is achieved by applying a pulse of logic high value to a corresponding pin of nine pins. The following table provides an indication of which inputs are simultaneously connected to what outputs when the the control signal provides a logic high value pulse to the pins.

TABLE

| PIN NUMBER | RECEIVING SWITCHES 122/123 | | TRANSMITTING SWITCH 121 | |
|---|---|---|---|---|
| | INPUTS | OUTPUT | INPUT | OUTPUT |
| 1 | 11/21 | 1 | 1 | 01 |
| 2 | 11/21 | 5 | 5 | 01 |
| 3 | 12/22 | 2 | 2 | 02 |
| 4 | 12/22 | 5 | 5 | 02 |
| 5 | 13/23 | 3 | 3 | 03 |
| 6 | 13/23 | 5 | 5 | 03 |
| 7 | 14/24 | 4 | 4 | 04 |
| 8 | 14/24 | 5 | 5 | 04 |
| 9 | GROUND PIN | | | |

During normal operations of transceivers 111–114, controller 130 outputs a detection control signal of 101010100. Accordingly, controller 130 applies a pulse having a logic high value to pins 1, 3, 5, and 7 when transceivers 111–115 are operating in a normal state, generates a detection control signal of 011010100 thus providing a logic low value signal to pin 1 and a logic high value signal to pin 2 during an abnormal state of first transceiver 111, generates a detection control signal of 100110100 thus providing a logic low value signal to pin 3 and a logic high value signal to pin 4 during an abnormal state of second transceiver 112, generates a detection control signal of 101001100 thus providing a logic low value signal to pin 5 and a logic high value signal to pin 6 during an abnormal state of third transceiver 113, and generates a detection control signal of 101010010 thus providing a logic low value signal to pin 7 and a logic high value signal to pin 8 during an abnormal state of fourth transceiver 114. Controller 130 provides the normal return control signal of 101010100 to pins 1–9 in order to simultaneously return the switched condition of switching circuits 121–123 to their original state.

Figure 2:
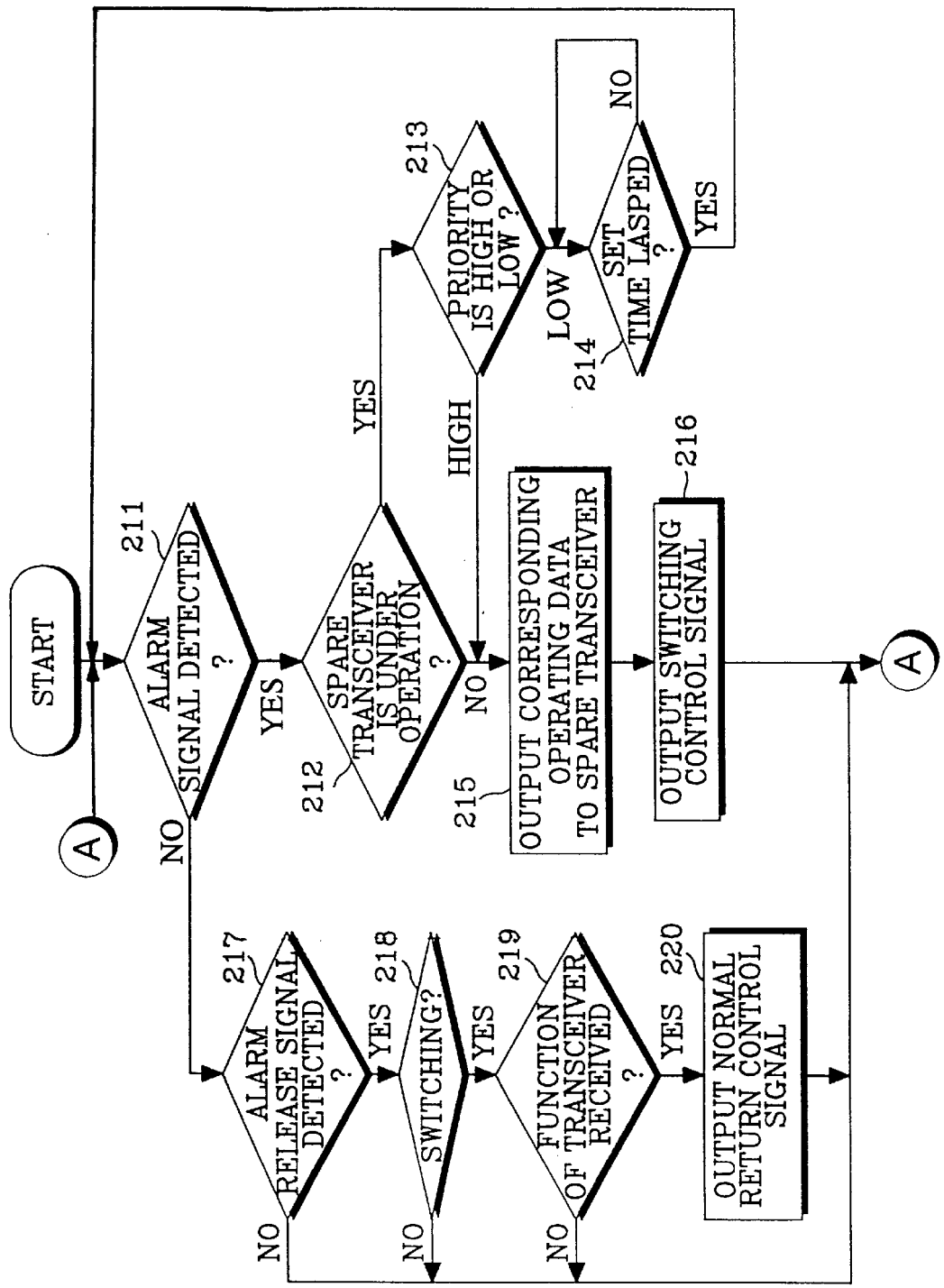
FIG. 2 is a flow chart showing a control method for the transceiver switching apparatus of FIGS. 1A and 1B according to the principles of the present invention.

Referring now to FIG. 2, a troubled one of transceivers 111–114 provides an alarm signal to controller 130 when an abnormal state is detected by a respective one of alarm detection and release sensing circuits 111A–114A, the abnormal state defining any kind of physical deviation or malfunction of the transceivers operating in a condition other than a normal operating condition. When controller 130 detects the alarm signal in step 211, it checks whether spare transceiver 115 is operating in step 212, while simultaneously evaluating the switching priority of the troubled transceiver for controlling when the switching operation to the spare transceiver occurs, wherein the switching priority is predetermined for each transceiver in order to establish a controlled switching order. When controller 130 determines in step 213, that the priority of the troubled transceiver is high the process proceeds to step 215, while if the priority is low, then the process proceeds to step 214. In step 214 a check of whether spare transceiver 115 is operating in step 212 after a lapse of a given time duration is performed. When it is determined in step 212 that spare transceiver 115 is not operating, then the process proceeds to step 215. In step 215 operating data corresponding to the troubled transceiver are provided to spare transceiver 115, and, in step 216, the switching control signal is applied to first and second receiving switching circuits 122, 123 and transmitting switching circuit 121. Thereafter, controller 130 again checks for an alarm signal from alarm detection and release sensing circuits 11A–114A. If an alarm signal is detected then steps 212–216 are again performed. If no alarm signal is detected in step 211, controller 130 determines whether the troubled transceiver has been repaired by detecting an alarm release signal in step 217. When controller 130 detects the alarm release signal a determination is made, step 218, as to whether spare transceiver 115 is switched over, and in step 219, it is determined by controller 130 whether all the functions of the corresponding repaired transceiver has been recovered to a normal state.

The "switched over" determination in step 218 is a determination as to whether or not the alarm release signal is from the same transceiver that generated the alarm signal causing controller 130 to switch over to the spare transceiver. If a transceiver having a low priority had generated an alarm signal while the spare transceiver was operating for a transceiver having a high priority, and if the low priority transceiver obtained a normal operational state before the high priority transceiver, then the low priority transceiver would generate an alarm release signal. Accordingly, step 218 prevents controller 130 from generating a normal return control signal while the spare transceiver is operating for the high priority transceiver.

Once step 218 determines that the alarm release signal is from the transceiver which caused controller 130 to switch over to the spare transceiver, step 219 is performed. Therefore, when it is confirmed in the step 219 that the functions of the corresponding repaired transceiver has recovered to a normal state, controller 130 generates the normal return control signal 101010100 in step 220 thereby returning first and second receiving switching circuits 122, 123 and transmitting switching circuit 121 back to their original state for normal operations.

As may be apparent from the foregoing, the present invention enables simultaneous control of the plurality of receiving switching circuits and the transmitting switching circuit, thereby leading to simplification of the control signals for switching over of a troubled transceiver. As a result, even if any kind of trouble should occur in any one of transceivers operating in a cellular base station, then it would allow a spare transceiver to be used for the troubled one by means of a switching apparatus according to the present invention, so that the cellular base station could continue to perform its normal operation as well as the maintenance and repair without any interruption to its telecommunication service.

While there has been illustrated and described what is considered to be a preferred embodiment of the present invention, it will be understood by those skilled in the art that various changes and modifications may be made, and equivalents made be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A transceiver switching apparatus for use in a cellular base station of a mobile telecommunication system, comprising:

a plurality of transceivers;

a spare transceiver;

a first receiving switching circuit having a plurality input terminals for receiving respective intermediate receiving frequencies corresponding to first intermediate receiving frequencies of said plurality of transceivers, and multiple output terminals respectively connected to said plurality of transceivers and said spare transceiver;

a second receiving switching circuit having a plurality input terminals for receiving respective intermediate receiving frequencies corresponding to second intermediate receiving frequencies of said plurality of transceivers, and multiple output terminals respectively connected to said plurality of transceivers and said spare transceiver;

a transmitting switching circuit having multiple input terminals respectively connected to receive transmission intermediate frequencies output by said plurality of transceivers and said spare transceiver, and a plurality of output terminals; and control means for supplying a detection control signal to said first and second receiving switching circuits and said transmitting switching circuit in response to detecting an abnormal operating condition of one of said plurality of transceivers, and for supplying a tuning frequency and operating data corresponding to said one of said plurality of transceivers to said spare transceiver;

said first and second receiving switching circuits each connecting one of said plurality of input terminals corresponding to said one of said plurality of transceivers to one of said multiple output terminal corresponding to said spare transceiver in response to said detection control signal;

said transmitting switching circuit connecting one of said multiple input terminals corresponding to said spare transceiver to one of said plurality of output terminals in response to said detection control signal.

2. The transceiver switching apparatus as set forth in claim 1, wherein each of said plurality of transceivers comprises an alarm detection and release circuit for supplying an alarm signal indicative of said abnormal operating condition to said control means when the corresponding transceiver malfunctions, and for supplying an alarm release signal to said control means when the corresponding transceiver is repaired.

3. The transceiver switching apparatus as set forth in claim 2, further comprising:

said control means for generating a return to normal control signal in response to said alarm release signal when said one of said plurality of transceivers is repaired;

said first and second receiving switching circuits each connecting said one of said plurality of input terminals corresponding to said one of said plurality of transceivers to one of said multiple output terminals corresponding to said one of said plurality of transceivers in response to said return to normal control signal; and said transmitting switching circuit connecting one of said multiple input terminals corresponding to said one of said plurality of transceivers to said one of said plurality of output terminals in response to said return to normal control signal.

4. The transceiver switching apparatus as set forth in claim 1, further comprising:

memory means connected to said control means, said memory means storing tuning frequencies and operating data corresponding to each of said transceivers; and said control means reading out from said memory said tuning frequency and operating data of said one of said plurality of transceivers upon detection of said abnormal operating condition and providing said tuning frequency and operating data to said spare transceiver.

5. The transceiver switching apparatus as set forth in claim 1, further comprising:

said control means for generating a return to normal control signal in response to an alarm release signal generated by said one of said plurality of transceivers when said one of said plurality of transceivers is repaired;

said first and second receiving switching circuits each connecting said one of said plurality of input terminals corresponding to said one of said plurality of transceivers to one of said multiple output terminals corresponding to said one of said plurality of transceivers in response to said return to normal control signal; and said transmitting switching circuit connecting one of said multiple input terminals corresponding to said one of said plurality of transceivers to said one of said plurality of output terminals in response to said return to normal control signal.

6. A method for transceiver switching in a cellular base station of a mobile telecommunication system having a plurality of transceivers and at least one spare transceiver, said method comprising the steps of:

providing each of said plurality of transceivers with respective first and second intermediate receiving frequencies;

outputting a plurality intermediate transmitting frequencies generated by said plurality of transceivers in response to said first and second intermediate receiving frequencies according to a corresponding tuning frequency of each of said plurality of transceivers;

detecting an alarm signal output from one of said plurality of transceivers, said alarm signal being indicative of said one of said plurality of transceivers functioning abnormally;

supplying said spare transceiver with a tuning frequency and operating data corresponding to said one of said plurality of transceivers in response to said alarm signal;

generating a detection control signal in response to said alarm signal;

providing said first and second intermediate receiving frequencies corresponding to said one of said plurality of transceivers to said spare transceiver in response to said detection control signal; and outputting an intermediate transmitting frequency generated by said spare transceiver in response to said first and second intermediate receiving frequencies corresponding to said one of said plurality of transceivers according to said corresponding tuning frequency of said one of said plurality of transceivers instead of said intermediate transmitting frequency generated by said one of said plurality of transceivers in response to said detection control signal.

7. The method as set forth in claim 6, further comprising the steps of:
   checking whether said spare transceiver is in operation when said alarm signal is detected from said one of said plurality of transceivers;
   performing said supplying step when it is determined that said spare transceiver is not in operation;
   determining a level of a switching priority of said one of said plurality of transceivers when it is determined that said spare transceiver is in operation;
   performing said supplying step when said switching priority is high; and
   returning to said step of checking whether said spare transceiver is in operation, after a lapse of a predetermined time, when said switching priority level is low.

8. The method as set forth in claim 6, further comprising the steps of:
   outputting an alarm release signal from said one of said plurality of transceivers when said one of said transceivers is again functioning normally;
   detecting said alarm release signal and generating a return to normal control signal in response thereto;
   providing said first and second intermediate receiving frequencies corresponding to said one of said plurality of transceivers to said one of said plurality of transceivers in response to said return to normal control signal; and
   outputting an intermediate transmitting frequency generated by said one of said plurality of transceivers in response to said first and second intermediate receiving frequencies corresponding to said one of said plurality of transceivers according to said corresponding tuning frequency of said one of said plurality of transceivers instead of said intermediate transmitting frequency generated by said spare transceiver in response to said return to normal control signal.

9. The method as set forth in claim 8, wherein said step of detecting said alarm release signal and generating a return to normal control signal comprises the steps of:
   determining whether said spare transceiver is switched over in response to an alarm signal generated by the same transceiver generating said alarm release signal;
   returning to said step of detecting an alarm signal when it is determined that said spare transceiver was not been switched over in response to an alarm signal generated by the same transceiver generating said alarm release signal;
   determining whether all functions of said one of said plurality of transceivers have been recovered to a normal state when it is determined that said spare transceiver was been switched over in response to an alarm signal generated by the same transceiver generating said alarm release signal;
   returning to said step of detecting an alarm signal when it is determined that all said functions of said one of said plurality of transceivers have not been recovered to a normal state; and
   generating a return to normal control signal when it is determined that all said functions of said one of said plurality of transceivers have been recovered to a normal state.

10. A transceiver switching apparatus for use in a cellular base station of a mobile telecommunication system, comprising:
   a plurality of transceivers, each generating an intermediate transmitting frequency in response to different corresponding first and second intermediate receiving frequencies supplied thereto according to a different corresponding tuning frequency;
   a spare transceiver;
   a first receiving switching circuit having a plurality input terminals for receiving respective intermediate receiving frequencies corresponding to first intermediate receiving frequencies of said plurality of transceivers, and multiple output terminals respectively connected to said plurality of transceivers and said spare transceiver;
   a second receiving switching circuit having a plurality input terminals for receiving respective intermediate receiving frequencies corresponding to second intermediate receiving frequencies of said plurality of transceivers, and multiple output terminals respectively connected to said plurality of transceivers and said spare transceiver;
   a transmitting switching circuit having multiple input terminals respectively connected to receive transmission intermediate frequencies output by said plurality of transceivers and said spare transceiver, and a plurality of output terminals; and
   control means for supplying a detection control signal to said first and second receiving switching circuits and said transmitting switching circuit in response to detecting an abnormal operating condition of one of said plurality of transceivers, and for supplying a tuning frequency and operating data corresponding to said one of said plurality of transceivers to said spare transceiver;
   said first and second receiving switching circuits each connecting one of said plurality of input terminals corresponding to said one of said plurality of transceivers to one of said multiple output terminal corresponding to said spare transceiver in response to said detection control signal;
   said spare transceiver generating an intermediate transmitting frequency in response to first and second intermediate receiving frequencies corresponding to said one of said plurality of transceivers according to said tuning frequency corresponding to said one of said plurality of transceivers;
   said transmitting switching circuit connecting one of said multiple input terminals corresponding to said spare transceiver to one of said plurality of output terminals in response to said detection control signal.

11. The transceiver switching apparatus as set forth in claim 10, wherein each of said plurality of transceivers comprises an alarm detection and release circuit for supplying an alarm signal indicative of said abnormal operating condition to said control means when the corresponding transceiver malfunctions, and for supplying an alarm release signal to said control means when the corresponding transceiver is repaired.

12. The transceiver switching apparatus as set forth in claim 11, further comprising:
   said control means for generating a return to normal control signal in response to said alarm release signal when said one of said plurality of transceivers is repaired;

said first and second receiving switching circuits each connecting said one of said plurality of input terminals corresponding to said one of said plurality of transceivers to one of said multiple output terminals corresponding to said one of said plurality of transceivers in response to said return to normal control signal; and said transmitting switching circuit connecting one of said multiple input terminals corresponding to said one of said plurality of transceivers to said one of said plurality of output terminals in response to said return to normal control signal.

13. The transceiver switching apparatus as set forth in claim 10, further comprising:

memory means connected to said control means, said memory means storing tuning frequencies and operating data corresponding to each of said transceivers; and said control means reading out from said memory said tuning frequency and operating data of said one of said plurality of transceivers upon detection of said abnormal operating condition and providing said tuning frequency and operating data to said spare transceiver.

14. The transceiver switching apparatus as set forth in claim 10, further comprising:

said control means for generating a return to normal control signal in response to an alarm release signal generated by said one of said plurality of transceivers when said one of said plurality of transceivers is repaired;

said first and second receiving switching circuits each connecting said one of said plurality of input terminals corresponding to said one of said plurality of transceivers to one of said multiple output terminals corresponding to said one of said plurality of transceivers in response to said return to normal control signal; and said transmitting switching circuit connecting one of said multiple input terminals corresponding to said one of said plurality of transceivers to said one of said plurality of output terminals in response to said return to normal control signal.

\* \* \* \* \*